Dec. 24, 1940.        J. E. OYS        2,226,013
DUSTER
Filed Jan. 13, 1939
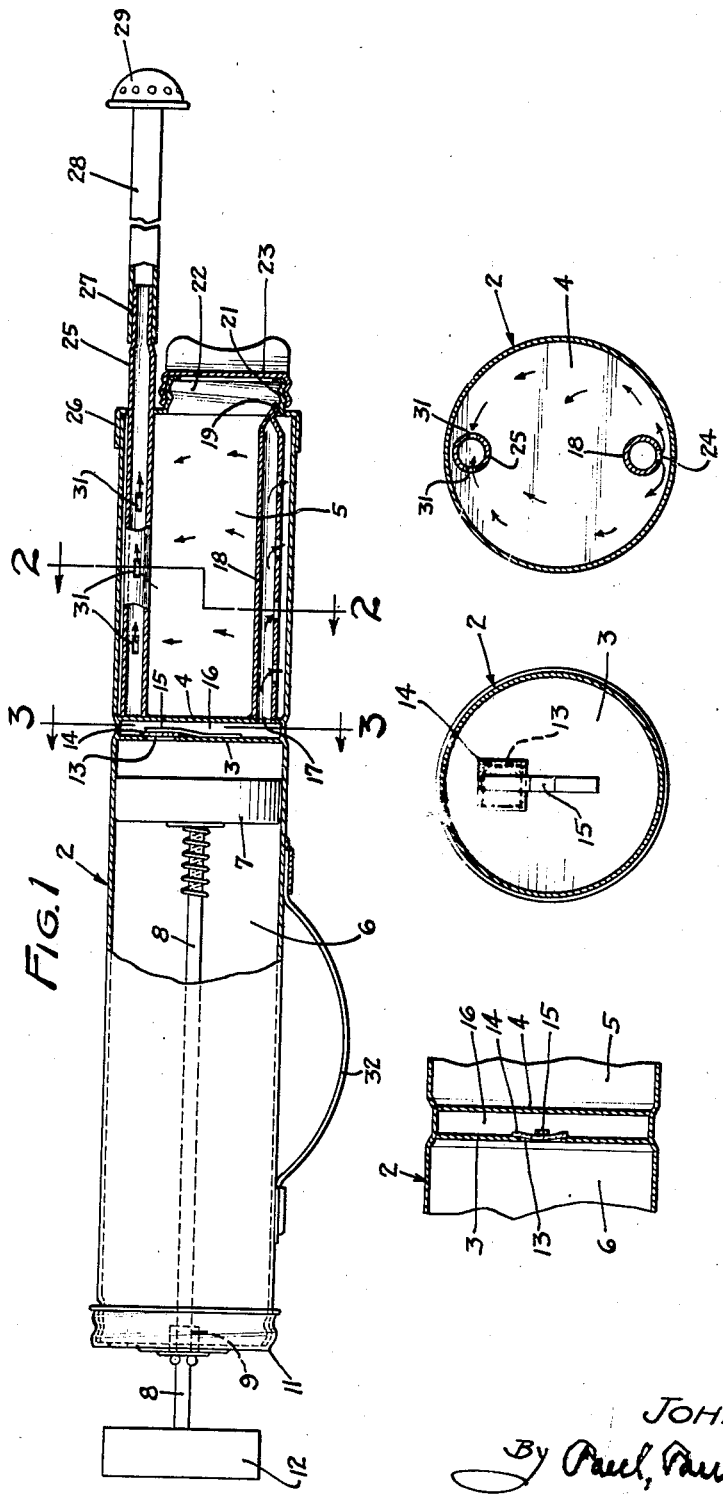
INVENTOR
JOHN E. OYS
By Paul, Paul, Moon Giers
ATTORNEYS Patented Dec. 24, 1940

2,226,013

UNITED STATES PATENT OFFICE 2,226,013

DUSTER

John E. Oys, Hastings, Minn., assignor to H. D. Hudson Manufacturing Company, Chicago, Ill., a corporation of Minnesota Application January 13, 1939, Serial No. 250,789

5 Claims. (Cl. 43—147)

This invention relates to new and useful improvements in dusters generally, and more particularly to such dusters of the character utilized for applying dust to plants, shrubs, and the like.

Dust, such as is commonly applied to plants, shrubs, trees, and the like, to protect them against the ravages of insects, usually consists of a suitable poison in dust form mixed with what is commonly known as a carrier. The poison dust is usually relatively heavier than the carrier dust and, as a result, has a tendency to settle to the bottom of the mass in the dust chamber. It is therefore essential that the dust be agitated within the chamber before it is discharged therefrom onto the plants, in order that the mixture will be uniform in consistency.

Numerous attempts have heretofore been made to develop a duster, particularly of the small hand operated type, whereby the dust in the dust chamber is constantly agitated, when the duster is in use, so that the dust discharging from the nozzle of the duster will be uniform in mixture. In some commercial dusters, the air delivered into the dust chamber to force the dust therefrom, is impinged against an end wall of the dust chamber, whereby the air will be given a more or less whirling action to cause it to agitate the dust. While such dusters may operate satisfactorily to a certain degree, they do not sufficiently agitate the entire mass of dust in the dust chamber, whereby all of the dust discharged from the duster will be of substantially uniform mixture.

The present invention is directed to a novel duster which is so constructed that all of the dust within the dust chamber is constantly being agitated, when the duster is in operation, whereby the ingredients constituting the mass of dust, are so thoroughly inter-mixed that the dust applied to the plants or shrubs will be very uniform, which is highly desirable in order to obtain maximum results.

An object of the present invention therefore is to provide a duster of the class described, which is so constructed that the air is delivered into the dust chamber in such a manner that the entire mass of dust is constantly agitated during the operation of the duster, whereby the dust applied to the plants or shrubs will be very uniform.

A further object is to provide a duster comprising a casing having a chamber therein adapted to receive a dust mixture, and a discharge conduit being secured to a wall of the casing and extending lengthwise through the chamber and having spaced apertures in its wall extending substantially the length of the conduit within the chamber, and an air supply tube being located within the chamber at a point substantially opposite from the discharge conduit and having means for supplying air thereto under pressure, said tube having a plurality of apertures in its wall spaced apart lengthwise thereof and arranged to direct the air against the adjacent wall of the casing, whereby the air discharging from the openings in said tube will be given a whirling action within the chamber in a direction substantially transverse to the longitudinal axis of the chamber, thereby causing the dust particles to be thoroughly agitated and intermixed before passing through the apertures in the discharge conduit to be discharged from said conduit onto the plants.

Other objects of the invention reside in the novel arrangement of the openings in the discharge conduit and air supply tube within the chamber of the duster, whereby all of the dust within the chamber is constantly subjected to the action of the whirling air currents, and whereby all of the dust may be discharged from the chamber; and, in the simple and inexpensive construction of the apparatus, as a whole, whereby it may be manufactured at small cost, which is desirable in devices of this general character.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

In the drawing:

Figure 1 is a side view of my novel duster, partially broken away to more clearly show the general construction of the dust chamber;

Figure 2 is a cross-sectional view on the line 2—2 of Figure 1, showing the direction of the air currents within the dust chamber, when the pumping means is operated to force air into the chamber;

Figure 3 is a cross-sectional view on the line 3—3 of Figure 1; and

Figure 4 is a detail sectional view showing the double partition between the dust chamber and pump casing.

In the selected embodiment of the invention here shown, there is illustrated in Figure 1, for purposes of disclosure, a duster comprising a casing, generally indicated by the numeral 2, and having a partition therein composed of spaced parallel walls 3 and 4. These walls divide the casing into two sections, one section forming a dust chamber 5 and the other section, a pump chamber or cylinder 6. A suitable piston 7 is mounted within the chamber 6 and has a rod 8 secured thereto which passes through a suitable guide opening 9 in the cap 11 of the casing 2 and is provided with a suitable operating handle 12. The piston 7 may be of conventional construction and is adapted to force air through an opening 13 in the partition wall 3. The opening 13 is normally closed by a suitable flap valve 14, which may be of any suitable material applicable for the purpose. This valve is retained in position by a suitable spring element 15, shown secured to the partition wall 3. The air forced through the opening 13 against the valve 14 passes through the space 16 between the partition walls 3 and 4, and through an opening 17 into the dust chamber, as will subsequently be described.

A feature of the present invention resides in the novel construction and the means provided for controlling the circulation of air through the dust chamber 5. As best shown in Figures 1 and 2, an air supply tube 18 is provided within the dust chamber adjacent the wall thereof. To simplify the explanation of the novel duster, Figure 1 will be considered as illustrating the duster in its normal operating position, wherein it will be noted that the air supply tube 18 is positioned in the bottom of the dust chamber 5. It is to be understood, however, that the apparatus may be supported in other positions than that shown in Figure 1, without departing from the scope of the invention.

The air supply tube 18 is closed at its outer end, as shown at 19 in Figure 1. This end of the tube engages the wall 21 of the filler opening 22 of the dust chamber and is preferably secured thereto as by soldering. A suitable cap 23 provides a closure for the filler opening 22.

The opposite end of the tube 18 is secured to the partition wall 4 and is in direct communication with the opening 17 in said wall. The air supply tube 18 is so positioned within the dust chamber that its wall is spaced slightly from the adjacent wall portion of the dust chamber, as clearly illustrated in Figures 1 and 2. A plurality of air discharge openings 24 are provided in that portion of the wall of the dust tube 18 which is positioned nearest to the wall of the dust chamber, as best shown in Figure 2. The tube 18, being spaced slightly from the wall of the casing, permits the air to circulate freely from the openings 24 and outwardly and upwardly around the tube, as indicated by the arrows in Figures 1 and 2.

A dust discharge conduit 25 passes lengthwise through the upper portion of the dust chamber, and is shown having its inner end suitably secured to the partition wall 4. The opposite end portion of the conduit 25 passes through the end wall or the cap 26 of the casing of the dust chamber. The projecting end portion of the conduit 25 may be slightly reduced in diameter, as shown at 27 in Figure 1, whereby an extension tube 28 may readily be attached thereto by a slip fit. The tube section 28 is preferably provided with a dust distributing head 29, secured to the tube section 28. To cause the dust within the chamber 5 to discharge from the dust distributing head 29 in a uniform mixture, the section of the conduit 25 which is disposed within the chamber 5, preferably has its wall provided with suitable dust receiving openings 31, arranged diametrically of the conduit and spaced apart lengthwise of the conduit, as shown in Figure 1. Because of the openings 31 in the conduit 25 being arranged as shown in Figure 2, the air discharging from the tube 18 will enter the conduit 25 from opposite sides thereof, indicated by the arrows in Figure 2. This arrangement of the openings 31 is desirable in that less resistance is offered to the passage of the dust from the chamber through the conduit 25 and extension 28, whereby the duster may be conveniently operated with the assurance that the mixture of poison dust and carrier will be uniformly applied to the plants or shrubs. The casing 2 is preferably provided with a suitable handle 32, whereby an operator may grasp the casing in one hand and operate the pump with the other hand by manipulation of the pump rod 8.

In the operation of the duster, the pump is operated by reciprocation of the rod 8, whereupon air is forced into the tube 18 within the dust chamber. The air thus forced into the tube 18 will discharge from the openings 24 in the lower wall thereof and be directed against the adjacent wall of the casing 2, whereby it is deflected outwardly and upwardly around the tube 18, as clearly indicated by the arrows in Figure 2. Such action of the air obviously will tend to remove all of the dust from the bottom of the dust chamber and impart thereto a whirling action within the chamber whereby all of the dust within said chamber will be given a whirling action to thoroughly mix the ingredients thereof so that the dust discharged from the distributing head 29 will be of uniform mixture.

The construction of the duster is extremely simple and inexpensive, whereby the duster readily lends itself to manufacture in quantity production, so that it may be sold to the trade at a nominal cost. Because of the air discharge openings 24 being arranged as shown in Figure 1, all of the dust particles, constituting the mass of dust within the dust chamber, will be kept in constant agitation during the operation of the pump, whereby it is impossible for the relatively heavier poison dust to settle to the bottom of the mass, as is more or less common in conventional dusters.

I claim as my invention:

1. In a duster of the class described, a casing having a chamber therein for receiving dust, a discharge conduit having one end extending into the upper portion of the chamber and located adjacent the upper wall thereof and having its opposite end projecting from one end of the casing and open to the atmosphere, said conduit having two rows of openings in its wall extending lengthwise of the conduit and disposed in diametric relation, a tube in the lower portion of the chamber having its wall spaced from the casing wall, means for supplying air under pressure to said tube, said tube having a plurality of openings in its wall facing in a direction to direct air against the casing wall, whereby a whirling action is imparted to the air in the chamber in a plane substantially transverse to the axis of the chamber, whereby the dust particles tending to settle to the bottom of the chamber because of having a relatively higher specific gravity than other particles, will be thoroughly agitated and intermixed with the lighter particles, so that the dust delivered onto the plants from said conduit will be uniform in composition.

2. In a duster of the class described, a casing having a chamber therein for receiving a dust insecticide, a discharge conduit extending into the chamber adjacent the wall thereof and having one end open to the atmosphere, said conduit having a plurality of rows of openings in its wall within the chamber and disposed in diametric relation, a tube for supplying air under pressure to the chamber, said tube extending into the chamber along the wall thereof at a point remote from said conduit and spaced from the casing wall, and said tube having a plurality of openings solely in that portion of its wall which is nearest the casing wall, whereby air discharging from the openings in said tube will be projected against the casing wall and thereby thoroughly agitate all of the dust in the chamber and cause it to discharge from the conduit in a uniform mixture, and wherein a plane passing through all the openings in the conduit is at right angles to a plane passing through all the openings in the tube.

3. In a duster of the class described, a casing having a chamber therein for receiving a dust insecticide, a discharge conduit extending into the chamber adjacent the wall thereof and having one end open to the atmosphere, said conduit having a plurality of openings in its wall within the chamber and disposed in diametric relation, a tube for supplying air under pressure to the chamber and having one end open to receive the air under pressure and the other end being closed and secured to the chamber to support the tube, said tube extending into the chamber along the wall thereof at a point remote from said conduit and spaced from the casing wall, and said tube having a plurality of openings solely in that portion of its wall which is nearest the casing wall, whereby air discharging from the openings in said tube will be projected against the casing wall and thereby thoroughly agitate all of the dust in the chamber and cause it to discharge from the conduit in a uniform mixture, and a plane passing through all the openings in the conduit is at right angles to a plane passing through all the openings in the tube.

4. In a duster of the class described, a casing having a chamber therein for receiving a dust insecticide, a discharge conduit extending into the chamber adjacent the wall thereof and having one end open to the atmosphere, said conduit having a plurality of openings in its wall within the chamber and disposed in diametric relation, a tube for supplying air under pressure to the chamber, said tube extending into the chamber along the wall thereof at a point remote from said conduit and spaced from the casing wall, and said tube having a plurality of openings solely in that portion of its wall which is nearest the casing wall, whereby air discharging from the openings in said tube will be projected against the casing wall and thereby thoroughly agitate all of the dust in the chamber and cause it to discharge from the conduit in a uniform mixture, and a plane passing through all the openings in the conduit is at right angles to a plane passing through all the openings in the tube, and a wall portion on the casing forming a filler opening for the chamber, said tube having one end open to receive the air under pressure and the other end being closed and secured to and in the wall portion to support the tube.

5. In a duster of the class described, a circular casing having a chamber therein for receiving an insecticide, and a pair of tubes extending diametrically opposite each other in spaced relationship from the cylindrical wall of the casing and parallel to the longitudinal axis of the chamber, one tube being adapted to receive air under pressure and having a plurality of openings in that portion of the tube which is nearest the wall of the casing and all parallel to the longitudinal axis of the chamber, and the other tube being adapted to serve to discharge the air and insecticide from the chamber and having a pair of rows of openings disposed in diametric relation relative to the two rows of the first-mentioned tube, a plane passing through both rows of openings in the second-mentioned tube is at right angles to a plane passing through the openings of the first-mentioned tube.

JOHN E. OYS.